United States Patent [19]
Shen

[11] 3,852,530
[45] Dec. 3, 1974

[54] SINGLE STAGE POWER AMPLIFIERS FOR MULTIPLE SIGNAL CHANNELS

[76] Inventor: Michael T. Shen, 8 Place Dargent, Eich, Luxembourg

[22] Filed: Mar. 19, 1973

[21] Appl. No.: 342,836

[52] U.S. Cl. .................... 179/1 GQ, 179/100.4 ST, 179/100.1 TD
[51] Int. Cl. .................... H04r 5/00
[58] Field of Search ..... 179/15 FD, 15 MM, 15 BL, 179/1 GQ, 1 G, 1 GP, 100.4 ST, 100.1 TD, 15 BT

[56] References Cited

UNITED STATES PATENTS

| | | | |
|---|---|---|---|
| 1,802,420 | 4/1931 | Green | 179/15 FD |
| 2,298,409 | 10/1942 | Peterson | 179/15 FD |
| 2,640,973 | 6/1973 | Cleaver | 179/15 FD |
| 2,792,449 | 5/1957 | Bottini | 179/1 G |
| 2,832,829 | 4/1958 | Reynolds | 179/1 GP |
| 3,374,315 | 3/1968 | Gladwin | 179/1 G |
| 3,375,329 | 3/1968 | Prouty | 179/1 GQ |
| 3,632,886 | 1/1972 | Scheiber | 179/1 GQ |
| 3,686,471 | 8/1972 | Takahashi | 179/1 G |
| 3,757,046 | 9/1973 | Williams | 179/1 GQ |

*Primary Examiner*—Kathleen H. Claffy
*Assistant Examiner*—Thomas D'Amico
*Attorney, Agent, or Firm*—Arthur L. Plevy

[57] ABSTRACT

There is disclosed apparatus for amplifying, for example, four separate stereo or audio information channels by means of a common power amplifier. Each audio channel is modulated on a respective carrier signal and then applied to a common amplifier which is of a wide-band circuit configuration.

Certain filtering and scanning techniques are also implemented to enable multiple channel amplification without the necessity of individual, separate amplifiers.

9 Claims, 3 Drawing Figures

Fig. 1.
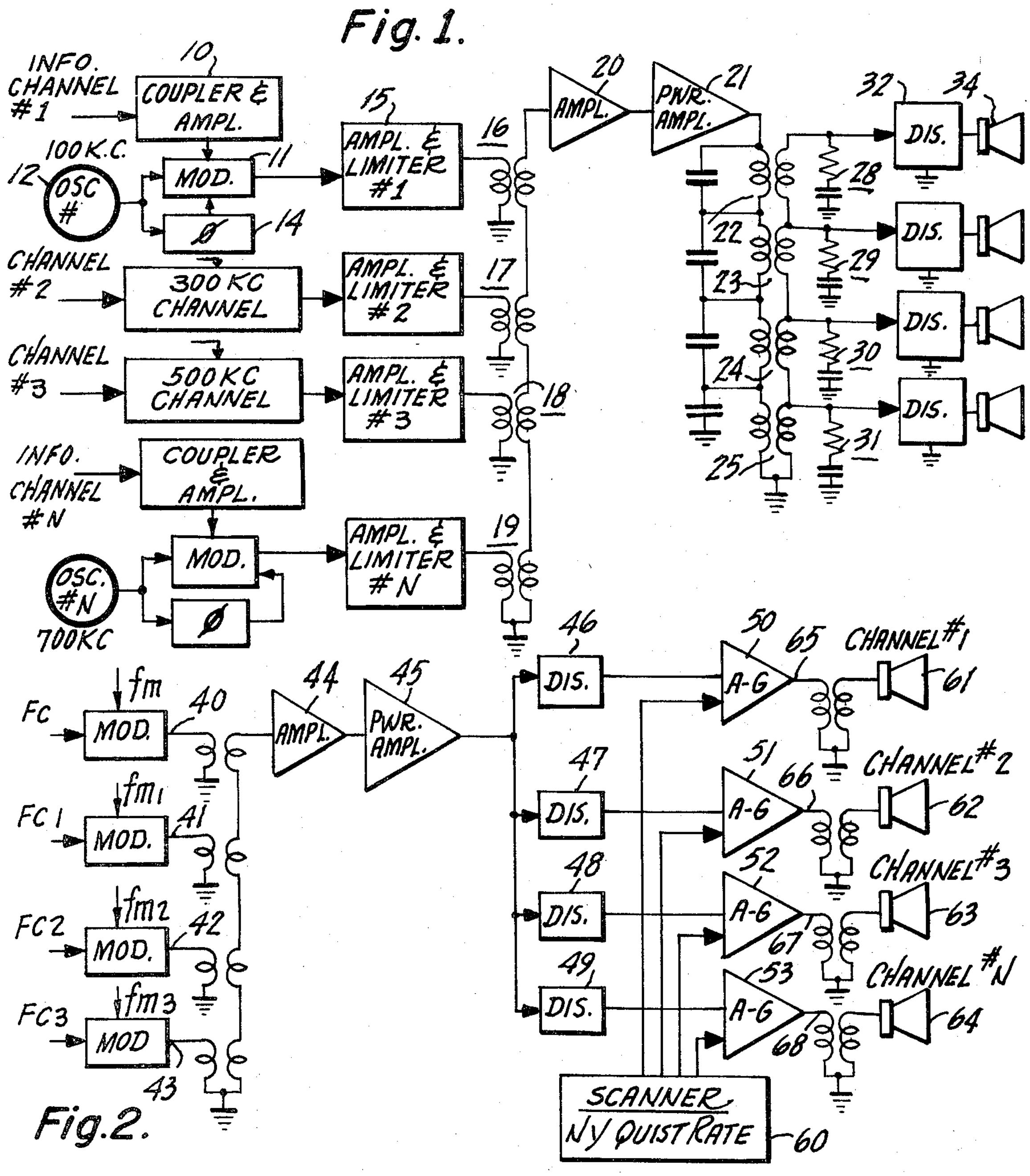
Fig. 1, Fig. 2.
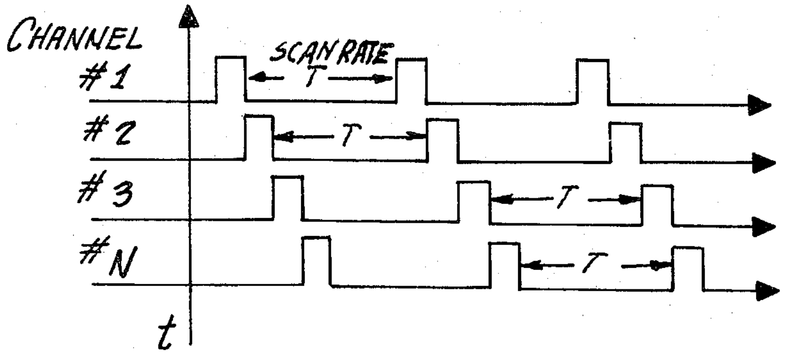
Fig. 3.

SINGLE STAGE POWER AMPLIFIERS FOR MULTIPLE SIGNAL CHANNELS

This invention relates to techniques and apparatus for amplifying a plurality of information channels by means of a single power amplifier and more particularly to such an amplifier arrangement for use in the audio field.

As is known, conventional audio equipment for consumer use may include stereo amplifiers, such components include output amplifiers referred to as power amplifiers for driving speakers and so on.

The audio products field has progressed in various stages all dependent upon the demand created in the market place. Hence, early audio equipment was referred to as high fidelity (HI-FI), as the consumer realized that power and bandwidth were related and in order to gain accurate and enjoyable playback of records and so on better power amplifiers were required. Hence, amplifiers were available using high power rated vacuum tubes and capable of providing high power output over a relatively large bandwidth.

Stereo reproduction became popular and the demand for high power and bandwidth increased, but in regard to two channel amplification. Hence, stereo amplifiers and receivers used at least two high power, relatively identical, amplifiers; each capable of driving a plurality of high quality speakers. Such channels were and are usually identified as Channel A and Channel B. Stereo broadcasting and recording introduced new problems in regard to channel separation, stereo separation and so on.

In any event, each channel of the stereo signal representative of right and left speakers or right and left audio was separately amplified, before application to the speakers, by a large bandwidth, high power amplifier. The requirements on such amplifiers were stringent and expensive power components were and continue to be used, as high power output transistors and integrated circuits.

Presently, the audio market is realizing an increasing demand for a four channel stereo system. A four channel system provides, as the name implies, four separate channels of audio information, front, left, right and back or rear.

Again, the manufacturer and designer is faced with new problems in regard to channel separation, stereo separation all imposed by the four channel requirements. In any event, there exists a wide variety of equipments using the prefix "QUAD," implying four channel, with all types of suffix designations. Such equipments, as their stereo predecessors, employ four separate high power, large bandwidth amplifiers to drive the at least four speakers necessary.

However, as can be easily ascertained, four relatively identical power amplifiers each of high performance capability impose an unduly high price on the consumer. While quality is a major factor to the audio buff, the cost of such equipment is by no means a minor factor.

It would be reasonable to estimate that the increased cost of four channel equipment to the consumer, while at least in part due to research is also due to the increased number of power amplifying channels, namely four instead of one or two.

It is therefore an object of this invention to provide a single power amplifying channel for the four stereo signals utilized in four channel systems.

This object is provided without a loss in quality, so that the consumer does not suffer a noticeable reduction in fidelity over the systems of the prior art which utilize at least four separate power amplifying devices.

BRIEF DESCRIPTION OF PREFERRED EMBODIMENT

Apparatus for amplifying a plurality of information signals by means of a common high power amplifier includes a plurality of modulators each one operative at a separate and distinct carrier frequency to provide at separate outputs a plurality of modulated signals with each of said information signals being modulated on one of said associated carrier frequencies, a single power amplifier has an input coupled to all of said modulators to provide at an output a composite signal representing the combination of all of said modulated signals, a plurality of frequency selective discriminator circuits each one operative to respond to a preselected one of said modulated signals are coupled to the output of said power amplifier to provide at each separate output of said discriminator circuits a corresponding amplified information signal, a plurality of utilization means are included, each separate one coupled to only one of said discriminator outputs, said utilization means further adapted to be selected at a high frequency rate by means of a scanner to permit only one of said discriminator signals to be applied to said utilization means at any given time and determined by said high frequency rate of said scanner.

BRIEF DESCRIPTION OF FIGURES

FIG. 1 is a schematic view of a multiple channel amplification system according to this invention;

FIG. 2 is a schematic view of an alternate configuration employing a scanning technique for use with a single power amplifier; and FIG. 3 is a series of timing diagrams showing the wave-shapes used in conjunction with the scanning technique employed in FIG. 2.

DETAILED DESCRIPTION OF FIGURES

Before describing the apparatus, it is recognized that techniques employed in the multiplexing field are utilized in part to implement the apparatus according to this invention.

However, the benefits afforded by such apparatus are important in regard to cost as indicated above, and the results obtained with the associated apparatus are completely unanticipated by the multiplexing or audio art in general.

The techniques utilized in stereo transmission and formulation of such signals are well known in the art for both two channel and four channel reproduction. Of course at the present time, there are competing systems in regard to the best way of producing good quality four channel records and broadcasts and no real permanent selection has been made.

In any event, the techniques for separating out the required signals in two or four channel stereo systems are well known.

Hence, the assumption will be made that the stereo signals or other audio signals are separated into their respective information channels prior to application to the unique power amplifying arrangements according to this invention.

Referring to FIG. 1, there is shown, for example, the four information channels representative of the four required signals for a four channel stereo system. The channels are respectively designated as INFO. CHANNEL No. 1, CHANNEL No. 2, CHANNEL No. 3 and CHANNEL No. N. Although the examples will describe a four channel stereo arrangement, it is understood that the techniques to be described may be utilized for two channel information or for N channel information, where N is greater than four.

The following description will be presented in regard to the processing technique for CHANNEL No. 1 information, with the understanding that the operation of the corresponding channels (2 to N) is relatively similar.

After separating the received stereo signal into the appropriate information channels, each signal (as INFO. CHANNEL No. 1) is applied to an associated coupler and amplifier module 10. The function of the coupler and amplifier 10 is to provide an impedance match and amplification between the source of CHANNEL No. 1 information and a modulator circuit 11.

The modulator circuit 11 may be a frequency or amplitude modulator. The modulator 11 operates to provide at its output a modulated carrier signal, having a carrier determined by the conversion oscillator 12 frequency with modulation components determined by the rate associated with the information signal. In this example, a modulation frequency of 100KHz is shown for conversion oscillator 12. The modulator 11 is assumed to be a frequency modulator and hence the oscillator 12 signal is also applied via a phase shift network 14 to another input of modulator 12.

The prior art is replete with a number of modulator configurations which would suffice for modulator 12. As such, these can be doubly balanced, singly balanced or unbalanced configurations, the function of modulator 12 being to provide the modulated signal about a carrier frequency determined by the conversion oscillator as oscillator 12.

In a similar manner, the other channels (2 to N) are modulated upon respective carriers of 300KHz, 500KHz and 700KHz. The selection of these frequencies is to provide adequate channel separation to avoid production of spurious interfering harmonics between the channels and in general to provide isolation. It is understood that the carrier frequencies are representative and other relationships would suffice as well.

The modulated carrier signal from modulator 11 is applied to an amplifier and limiter circuit 15.

The function of circuit 15 is to limit the FM signal in amplitude so that the signal can be easily accommodated by the common amplifying arrangement to be described.

The amplitude limited FM signal is applied to the primary of a transformer 16. The secondary winding of transformer 16 is in series with the secondary windings of the other information channel transformers 17, 18 and 19.

Accordingly, the FM signals from each channel after processing are combined at the input to a common amplifier 20. Amplifier 20 has the input terminal coupled to the series path formed by the secondary windings of transformers 16 to 19 and hence is responsive to the 100, 300, 500 and 700KHz modulated carrier signals.

Amplifier 20 may be a wide-band amplifier available as an integrated circuit configuration, and as such will equally amplify all applied FM signals to the same degree. The composite signal or combined signal emanating from amplifier 20 is applied to the input of a high power amplifier 21. Amplifier 21, for example, may be one capable of providing 300 watts at the output. This amplifier is also available in a wide-band integrated circuit configuration. The output of amplifier 21 is connected to a series arrangement of primary windings of output transformers 22, 23, 24 and 25. Each transformer as shown may be tuned to select the associated carrier as 100, 300, 500 or 700KHz. It is noted that because of the separation between carriers (200KHz) the characteristics of the tuning will not affect processing, as the 200KHz separation can be accommodated so that each respective frequency is passed.

The secondary windings of each transformer 22 to 25 are respectively coupled to a series shunt network or filter arrangement 28 to 31. The function of these networks is to provide a shunt for those carriers of adjacent channels. For example, assume transformer 22 is responsive to the 700KHz signal. Hence, the primary of 22 is tuned to 700KHz, this tuning still permits 100, 300 and 500Hz to propagate to transformers 23–25. The shunt filter 28 would then direct any components at 100KHz, 300KHz and 500KHz to ground, thus 700KHz carrier would appear primarily at the input to discriminator 32.

Discriminator 32 may be of the Foster-Seeley type or a ratio detector or other suitable configuration. The function of discriminator 32 is to respond to the modulation components on the associated carrier waveform to thereby retrieve the original information channel signal as amplified by the common power amplifier 21. This signal can then be applied to a speaker or other output device 34.

Before proceeding with a description of subsequent figures, a few comments will be offered in regard to the above embodiment.

It is first noted that power amplifier 21 because of the common coupling path drives all the primary windings 22 to 25 and hence the power supplied via amplifier 21 is distributed across each transformer, such that the total power for each output channel is substantially less than the power capabilities of amplifier 21. In any event, the recovered power in each channel may be on the order of 50 to 100 watts depending upon the power gain of amplifier 21 and the impedance relationships of each transformer 22 to 25 with respect to one another.

It is of course noted that the system requires only a single power amplifier 21 instead of four separate high power amplifiers and hence reduces cost and manufacturing time of the final product.

Referring to FIG. 2 there is shown an alternate embodiment according to this invention requiring a single power amplifier to drive a plurality of speakers or output devices.

In FIG. 2 four channels are again shown and designated respectively as having carrier frequencies FC, FC1, FC2 and FC3. Fewer or greater channels can be used as above described. The carriers can be selected as above described or can be higher in frequency or lower thus affording greater selectivity and minimizing the generation of interferring frequency components and spurious products.

Accordingly, each information channel signal as fm, fm1, fm2 and fm3 are previously separated and applied with their associated carrier frequency to individual modulators 40 to 43.

For the sake of simplicity, amplifiers and limiters are not shown, nor are selective networks as were shown in FIG. 1. An amplifier 44 receives the composite signal representative of the modulated signals similar to amplifier 20 of FIG. 1. The output from amplifier 44 is applied to the input of a common power amplifier 45. the amplifier 45 is coupled to the inputs of four discriminator circuits 46–49.

It is noted that this coupling may be afforded by transformer coupling as shown in FIG. 1 and may include selective networks all considered to be part of the discriminator. In any event, it is known that a discriminator as 46 to 49 may itself be a frequency selective device and respond only to carrier frequencies within its tuning range. The output of each discriminator is applied to an input of an associated audio gate (A–G) 50 to 53. For example, the output of discriminator 46 is applied to one input of a double input radio gate 50. In turn, each discriminator has an output coupled to an input of the associated audio gate (i.e., discriminator 47 to input of gate 51 and so on).

The other input of gate 50 is supplied via a scanner circuit 60 as is each of the other gate inputs.

The scanner circuit 60 operates at at least the Nyquist Rate. According to the Nyquist theory one has to scan or sample a given signal at a least twice the highest frequency available to obtain a good approximation of the input signal or that signal provided at the output of discriminator 46, for example.

In an audio system assume each signal representative of stereo information occupies a relatively equal bandwidth from 20Hz to 20,000Hz. The Nyquist rate would therefore have to be at least 40,000Hz. However, in audio systems this rate should even be higher say for example 100KHz, which is a signal incapable of being heard by a listener. In this manner each channel is sampled, for example, 100,000 times each second and the information developed by the associated discriminator is applied to the speakers 61 to 64, 100,000 times each second.

The scanning rate is rapid when compared to the information rate and is not audible. Furthermore, there are enough samples for a suitable duration such that the energy content of the audio signal is not significantly decreased.

The scanner 60 can be a ring counter, a binary counter, or a recirculating shift register and will provide, for example, at individual outputs the signals shown in FIG. 3.

Therefore, information from each channel is only permitted to pass to the associated speaker during the presence of the scanning pulse for that channel. It is this pulse that enable the audio gates (A–G) 50 to 53.

Since the rate of scan is rapid compared to the information rate, there is a minimal decrease in fidelity.

However, as one can tell, the power amplifier is operating relatively unloaded, since only one discriminator is applying power to a speaker at any one instant of time.

It is also understood that the gates 50–53 can be positioned before the discriminators 46–49, thus affording complete power drive to only one discriminator at any one time.

The advantages of the above described system are inherent in reducing the loading of the power amplifier 45 as well as assuming impedance stabilization because of the restraint on permitting single circuit operation due to the scanning technique.

It is also seen that the scanning rate being higher than any audio component can be completely eliminated by a suitable filter which can also be implemented by tuning the output transformers 65 to 68.

Hence, the above described apparatus allows a stereo receiver or component manufacturer to utilize a single power stage in lieu of individual stages with a decrease in manufacturing and component cost and with an increase in reliability due to fewer components without any significant sacrifice in fidelity.

While the above description described the techniques and apparatus of the invention, other embodiments may become apparent to those skilled in the art as for example the above-noted change in position between the audio gates and discriminators as well as selection of higher or lower carrier frequencies, scanning rates and scanning durations.

Furthermore, it can also be seen that the scanner can actually be placed after the modulators 40–43 of FIG. 2 for example. Each modulator would have an output coupled to an input of a dual input gate as 50–53 and the other inputs coupled to a scanner as 60.

Accordingly, the advantage of this configuration is that the scanning takes place at a low power level rather than the high power level as shown in FIG. 2. This enables even more reliable operation.

What is claimed is:

1. Apparatus for amplifying a plurality of audio information signals by means of a common power amplifying stage, comprising:

a. a plurality of modulating means each operating at a separate carrier frequency and having a separate output, each separate one of said modulating means associated with one of said audio signals for providing a plurality of separate modulated signals each representative of one of said audio signals and differing one from the other by said carrier frequency, b. power amplifying means having an input terminal and an output terminal, said input terminal including means for coupling each of said output terminals of said modulating means to said input terminal of said power amplifying means to provide at said output a composite signal representing the combination of all of said modulated signals, c. a plurality of discriminator circuits, each associated with a separate one of said modulated signals each of said discriminator circuits having an input coupled to said output of said power amplifying means and an output for providing thereat said associated audio information signal, d. a plurality of utilization means each separate one coupled to one of said discriminator output circuits, e. scanning means operative to provide a plurality of waveforms at a plurality of separate outputs, each of said waveforms having the same repetition rate which rate is relatively higher than any frequency component contained in said audio information signals, and each having a predetermined signal duration and a specified delay between each waveform, and f. means coupling a separate one of said outputs to one of said utilization means to cause said utilization means to utilize said discriminator output signal only during said predetermined signal duration.

2. The apparatus according to claim 1 wherein said means included in said power amplifier means comprises:

a. a plurality of transformers each having a primary and a secondary winding, each separate primary winding coupled to one of said outputs of said modulating means, said secondary windings being coupled in a series path between said input terminal of said power amplifying means and a point of reference potential.

3. The apparatus according to claim 1 wherein said audio information signals are those signals developed by a four channel audio stereo system, wherein said plurality specified is equal to four.

4. In a system of the type providing a plurality of information bearing signals, each of said signals being modulated on a separate carrier frequency to provide a plurality of separate modulated signals, each of said modulated signals separated from each other in carrier frequency by a predetermined frequency interval, the improvement therewith comprising apparatus for amplifying said plurality of information signals, comprising:

a. a power amplifier having input and output terminals and including means coupled to said input terminal adapted to receive all of said modulated signals to provide at said output terminal an amplified version of all of said modulated signals manifesting a composite signal, b. a plurality of frequency discriminating circuits each one of which is solely responsive to one of said carrier signals to provide at the output of each discriminating circuit a signal representative of one of said information signals, c. a plurality of utilization means each having at least two inputs, one of said inputs solely coupled to one output of one of said discriminating circuits, and d. scanning means operable to provide a plurality of separate waveforms at a plurality of distinct outputs each displaced from one another by a given time delay, each separate one of said outputs of said scanning means coupled to said other input of said utilization means to cause only utilization means to respond to said information signal, said waveforms having a repetition rate relatively higher than any frequency component contained in said associated information signal.

5. The system according to claim 4 wherein said system is a four channel stereo system.

6. The apparatus according to claim 5 wherein said waveforms available from said scanning means have a repetition rate greater than 100,000Hz.

7. The apparatus according to claim 4 wherein said separate modulated signals are frequency modulated signals each having said separate carrier frequency from a first carrier frequency to a last carrier frequency.

8. The apparatus according to claim 4 wherein each of said information signals occupies relatively the same bandwidth.

9. The apparatus according to claim 8 wherein said bandwidth is between 10Hz to greater than 15KHz.

* * * * *